United States Patent
Kitajima

(10) Patent No.: US 6,629,655 B2
(45) Date of Patent: Oct. 7, 2003

(54) FASTENING STRUCTURE FOR FISHING EQUIPMENT PARTS

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/241,516

(22) Filed: Sep. 12, 2002

(65) Prior Publication Data

US 2003/0066920 A1 Apr. 10, 2003

(30) Foreign Application Priority Data

Oct. 4, 2001 (JP) .......................................... 2001-308503

(51) Int. Cl.[7] ............................................... A01K 89/01
(52) U.S. Cl. ....................................... 242/311; D22/140
(58) Field of Search ................................. 242/310, 311, 242/312, 316, 323; D22/140, 141

(56) References Cited

U.S. PATENT DOCUMENTS

| | | | | |
|---|---|---|---|---|
| 2,487,316 A | * | 11/1949 | Daniel | 242/287 |
| 2,777,648 A | * | 1/1957 | Wood | 242/323 |
| 3,467,336 A | * | 9/1969 | Appleton | 242/291 |
| 4,871,126 A | * | 10/1989 | Myojo et al. | 242/323 |
| 5,476,230 A | * | 12/1995 | Yamaguchi | 242/311 |
| 5,683,051 A | * | 11/1997 | Hitomi et al. | 242/311 |
| 5,934,586 A | * | 8/1999 | Kang et al. | 242/241 |
| 5,984,220 A | * | 11/1999 | Kawabe | 242/241 |
| 6,102,317 A | * | 8/2000 | Bernard et al. | 242/319 |

* cited by examiner

*Primary Examiner*—Emmanuel M Marcelo
(74) *Attorney, Agent, or Firm*—Shinjyu Global IP Counselors, LLP

(57) ABSTRACT

A reel body of a spinning reel includes: a body member having an opening on a side portion thereof; a lid member screwed to the body member so as to close the opening of the side portion of the body member; a cover member attached along the outer shape of the rear of the body member and the lid member; a nut member; and a screw member. The body member has a recessed portion and a bore portion formed such that surfaces defining the recessed portion and the bore portion open out. The recessed portion and the bore portion are connected. The nut member is non-rotatably coupled to the recessed portion. The screw member is coupled to the bore portion to be inserted into the nut member. The present invention provides a simple and inexpensive fastening structure.

20 Claims, 8 Drawing Sheets

FASTENING STRUCTURE FOR FISHING EQUIPMENT PARTS

BACKGROUND OF THE INVENTION

1. Field of the Invention

This invention generally relates to fastening structures. More specifically, the present invention relates to fastening structures for fishing equipment.

2. Background Information

In fishing equipment used for fishing reels, screw members such as machine screws are often used to fasten a fishing equipment part to another fishing equipment part. For example, a lid member is fastened using machine screws to a body member of a reel body of a fishing reel. Where fishing equipment parts are fastened using machine screws, a boss portion is formed in the body member and a screw hole is formed in the boss portion. Then, a mounting hole is formed in the lid member so as to oppose the screw hole, such that a machine screw can be inserted through the mounting hole and threadedly coupled to the screw hole.

In the above-described conventional fastening structure for fishing equipment, two members, in other words a body member and a lid member, are fastened with machine screws. In this configuration, when the body member is formed by die-removal molding of a synthetic resin or a metal such as an aluminum alloy, and in particular when the orientation in which the die is drawn out is different from the orientation of the screw hole to be formed in the boss portion, it is necessary to perform a post-processing to form the screw hole. Accordingly, processing of screw holes is complicated. In addition, the manufacturing cost can increase due to the increase in the number of manufacturing steps.

In view of the above, there exists a need for a fastening structure which overcomes the above mentioned problems in the prior art. This invention addresses this need in the prior art as well as other needs, which will become apparent to those skilled in the art from this disclosure.

SUMMARY OF THE INVENTION

Accordingly, it is an object of the present invention to provide a fastening structure for fishing equipments that enables fishing equipment parts to be fastened with a simple and inexpensive configuration.

According to a first aspect of the invention, a fastening structure for fishing equipment parts includes a first inner fishing equipment part having a recessed portion and a bore portion; an outer fishing equipment part having a screw hole; a nut member unrotatably coupled to the recessed portion of the first inner fishing equipment part; and a screw member coupled to the bore portion of the first inner fishing equipment part and the screw hole of the outer fishing equipment part to be screwed into the nut member. The recessed portion and the bore portion are formed such that surfaces defining the recessed portion and the bore portion open out and that the bore portion and the recessed portion are connected.

In this fastening structure, the first inner fishing equipment part has a recessed portion to which the nut member is non-rotatably attached and a bore portion into which the screw member is coupled. In this case, for example, the nut member is attached to the first inner fishing equipment part. Then, the outer fishing equipment part is attached to the first inner fishing equipment parts. The first inner and outer fishing equipment parts are secured by screwing the screw member into the nut member.

The recessed portion and the bore portion of the first inner fishing equipment part are formed such that the surfaces defining the recessed portion and the bore portion open out and that the recessed portion and the bore portion are connected. Thus, the recessed portion and the bore portion can be formed without having to perform a post-processing. Accordingly, the need to form screw holes in the fishing equipment parts by the post-processing is eliminated. Therefore, fastening of fishing equipment parts can be achieved with a simple and inexpensive configuration.

According to a second aspect of the invention, in the fastening structure for fishing equipment parts, the first inner fishing equipment part is formed by die-removal molding. In this case, the recessed portion and the bore portion of the first inner fishing equipment part are formed by die-removal molding, and consequently, formation of fishing equipment parts can be facilitated.

According to a third aspect of the invention, the nut member is coupled to the recessed portion so that it is immovable in the direction of an axis of the screw member. With this configuration, the screw member can easily be screwed into the nut member.

According to a fourth aspect of the invention, the first inner fishing equipment part has a protruding portion with which the nut member is in contact. With this configuration, the nut member can be easily prevented from moving in the direction of the axis of the screw member.

According to a fifth aspect of the invention, the fastening structure further includes a second inner fishing equipment part disposed adjacent to the first fishing equipment. The surfaces of the bore portion and the recessed portion open out toward the third fishing equipment.

According to a sixth aspect of the invention, the second inner fishing equipment part has a bore portion to which the screw member is coupled.

According to a seventh aspect of the invention, the bore portions of the first and second inner fishing equipment parts are threaded bores to which the screw member is coupled.

According to a eighth aspect of the invention, the second inner fishing equipment part has a recessed portion to which the nut member is coupled.

According to a eighth aspect of the invention, the bore portions of the first and second inner fishing equipment parts are both semi-circular in shape.

According to a tenth aspect of the invention, the first inner fishing equipment part is a body member of a reel body in a fishing reel, the second inner fishing equipment part is a lid member attached to the body member, and the outer fishing equipment part is a cover member fastened to the body member and the lid member. With this configuration, the cover member can be fastened to the body member and to the lid member with a simple and inexpensive configuration.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
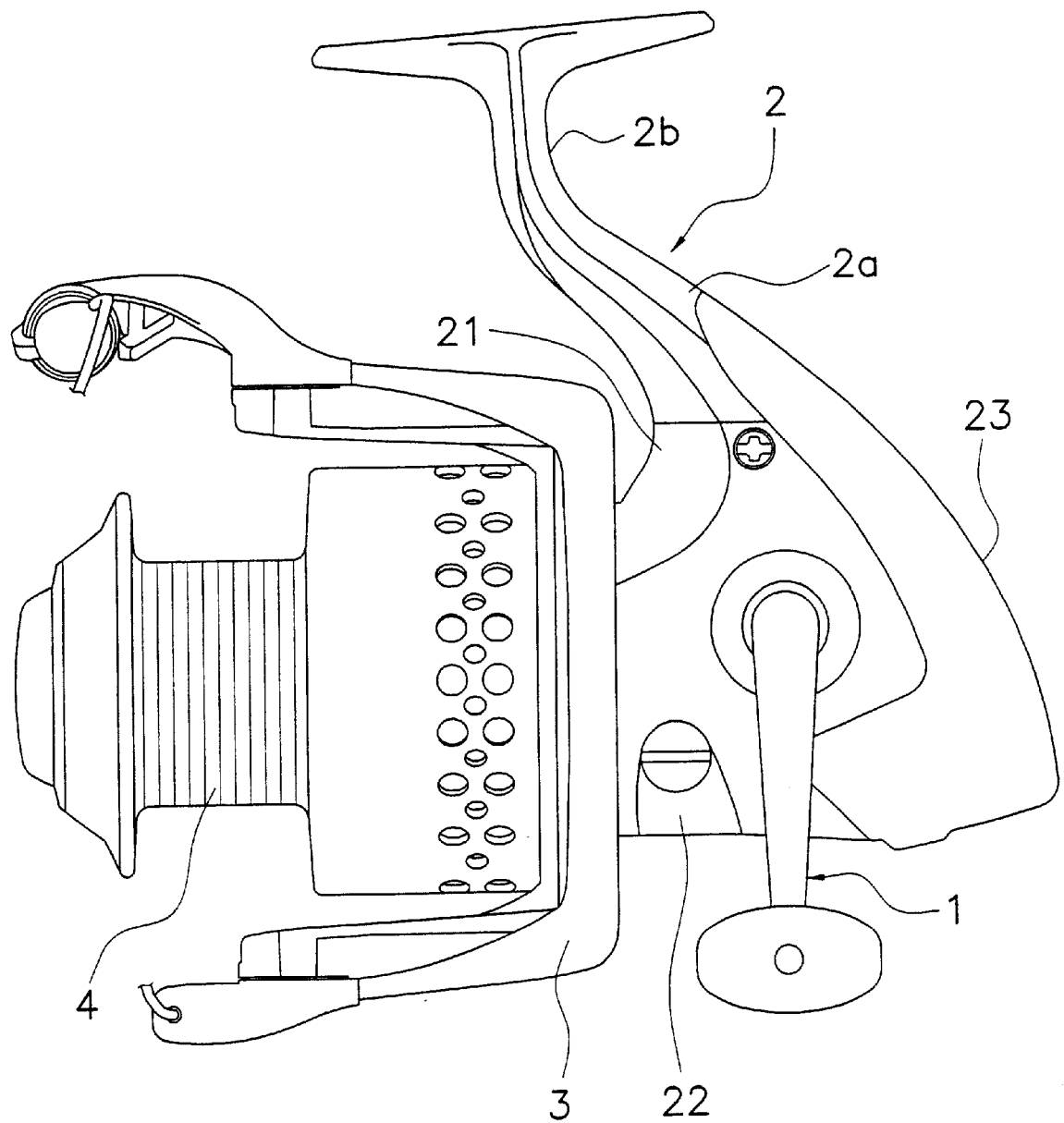
FIG. 1 is a left side view of a spinning reel adopting the fastening structure in accordance with a first embodiment of the present invention.

Referring initially to FIG. 1, a spinning reel employing a fastening structure in accordance with an embodiment of the present invention is illustrated.

As shown in FIG. 1, the spinning reel includes, a reel unit 2 rotatably supporting a handle 1, a rotor 3, and a spool 4. The rotor 3 is rotatably supported at the front of the reel unit 2. The spool 4 is provided for winding a fishing line around the outer peripheral surface thereof, and is disposed at the front of the rotor 3 so as to be movable back and forth.

Figure 2:
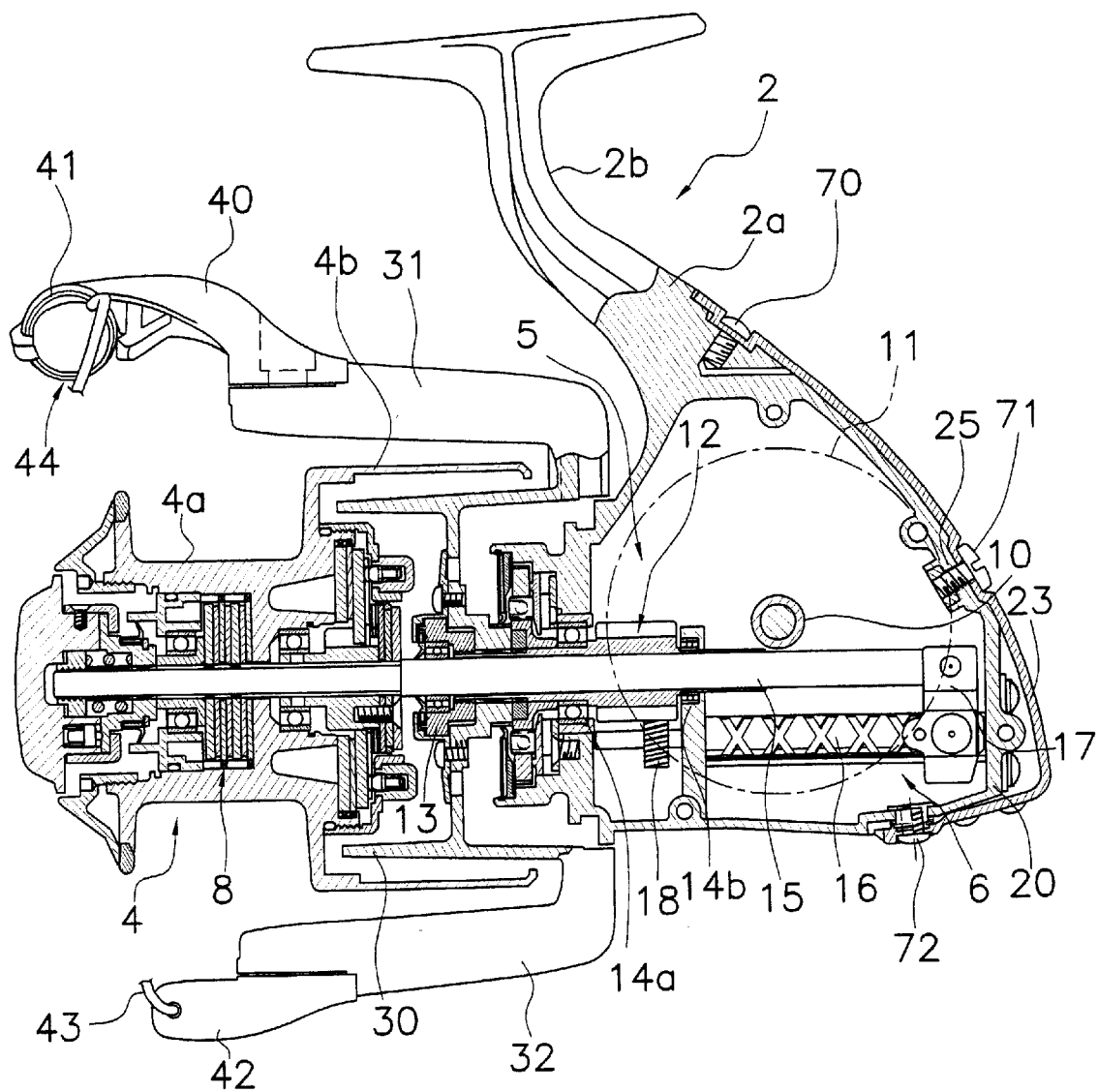
FIG. 2 is a left side cross-sectional view of the spinning reel.

The reel unit 2 includes, as shown in FIG. 2, a reel body 2a and a rod mounting leg 2b extending from the reel body 2a in an obliquely frontward and upward direction. As shown in FIG. 2, the reel body 2a has a housing space inside, and the housing space accommodates a rotor drive mechanism 5 for rotating the rotor 3 in association with rotation of the handle 1, and an oscillating mechanism 6 for uniformly winding the fishing line by moving the spool 4 back and forth.

As shown in FIG. 2, the rotor 3 has a cylindrical portion 30 and first and second rotor arms 31 and 32, which are formed opposite from each other on the sides of the cylindrical portion 30. The cylindrical portion 30 and the first and second rotor arms 31 and 32 are made of, for example, an aluminum alloy, and are formed as one unitary piece.

The first rotor arm 31 curves outward and extends frontward from the cylindrical portion 30. A portion of the first rotor arm 31 that is connected to the cylindrical portion 30 curves and spreads in the circumferential direction of the cylindrical portion 30. On the outer circumference side of a front end of the first rotor arm 31, a first bail support member 40 is pivotably attached. On the front end of the first bail support member 40, a line roller 41 is attached for guiding the fishing line to the spool 4.

The second rotor arm 32 curves outward and extends from the cylindrical portion 30. A portion of the second rotor arm 32 that is connected to the cylindrical portion 30 curves and spreads in the circumferential direction of the cylindrical portion 30. On the outer circumferential side of a front end of the second rotor arm 32, a second bail support member 42 is pivotably attached.

A bail 43 is fixedly coupled between the line roller 41 and the second bail support member 42. The bail 43 is made of a wire material and is substantially bent into a U-shape. The first bail support member 40, the second bail support member 42, the line roller 41, and the bail 43 form a bail arm 44 that guides the fishing line onto the spool 4. The bail arm 44 is pivotable between a line guiding position and a line releasing position. The bail arm 44 is in the line guiding position in FIG. 2. The bail arm 44 can be shifted to the line releasing position from the line guiding position by flipping over the bail 43.

As shown in FIG. 2, the spool 4 is disposed between the first rotor arm 31 and the second rotor arm 32 of the rotor 3. The spool 4 is obtained by, for example, forging an aluminum alloy. The spool 4 is a cylindrical member having a small-diameter cylindrical portion and a large-diameter cylindrical portion. More specifically, the spool 4 has a tubular bobbin trunk portion 4a, onto the outer circumference of which the fishing line is wound, and a large-diameter tubular shaped skirt portion 4b, which is formed continuously with the rear portion of the bobbin trunk portion 4a.

The rotor drive mechanism 5 has, as shown in FIG. 2, a face gear 11 and a pinion gear 12. The face gear 11 rotates together with a handle shaft 10 that is connected to the handle 1. The pinion gear 12 meshes with the face gear 11. The pinion gear 12 is formed in a hollow tubular shape. The front portion of the pinion gear 12 extends through the center portion of the rotor 3. The pinion gear 12 is secured to the rotor 3 by a nut 13. In the reel unit 2, the pinion gear 12 is rotatably supported by bearings 14a and 14b at its axial middle portion and at its axial rear end portion, respectively. At the front portion of the pinion gear 12, chamfered portions having a predetermined length and disposed parallel to each other are formed. The purpose of forming the chamfered portions on the pinion gear 12 is to non-rotatably connect the rotor 3 to the pinion gear 12.

As shown in FIG. 2, the oscillating mechanism 6 moves the spool 4 back and forth by moving back and forth a spool shaft 15 that is coupled to the center of the spool 4 via a drag mechanism 8. The oscillating mechanism 6 has a worm shaft 16 that is disposed below and parallel to the spool shaft 15, a slider 17 that moves back and forth along the worm shaft 16, and an intermediate gear 18 that is secured at the foremost end of the worm shaft 16. The rear end of the spool shaft 15 is non-rotatably secured to the slider 17. The intermediate gear 18 meshes with the pinion gear 12 via a braking mechanism 7, as shown in FIG. 3.

As shown in FIGS. 1 and 2, the reel body 2a has a body member 20 having an opening on its side and the above-mentioned housing space inside; a lid member 21 disposed adjacent to and screwed to the body member 20 so as to close the opening on the side of the body member 20; a small lid member 22 detachably attached to the lid member 21; and a cover member 23 attached along the outer shape of the rear of the body member 20 and the lid member 21. The cover member 23 is detachably secured using screw members 70, 71, and 72 at three locations in the contact surface S (see FIG. 1) at which the body member 20 and the lid member 21 are butt-joined. The screw member 71 is screwed into a nut member 25 attached to the body member 20.

The portion that is fastened by the screw member 71 is further detailed below.

Figure 3:
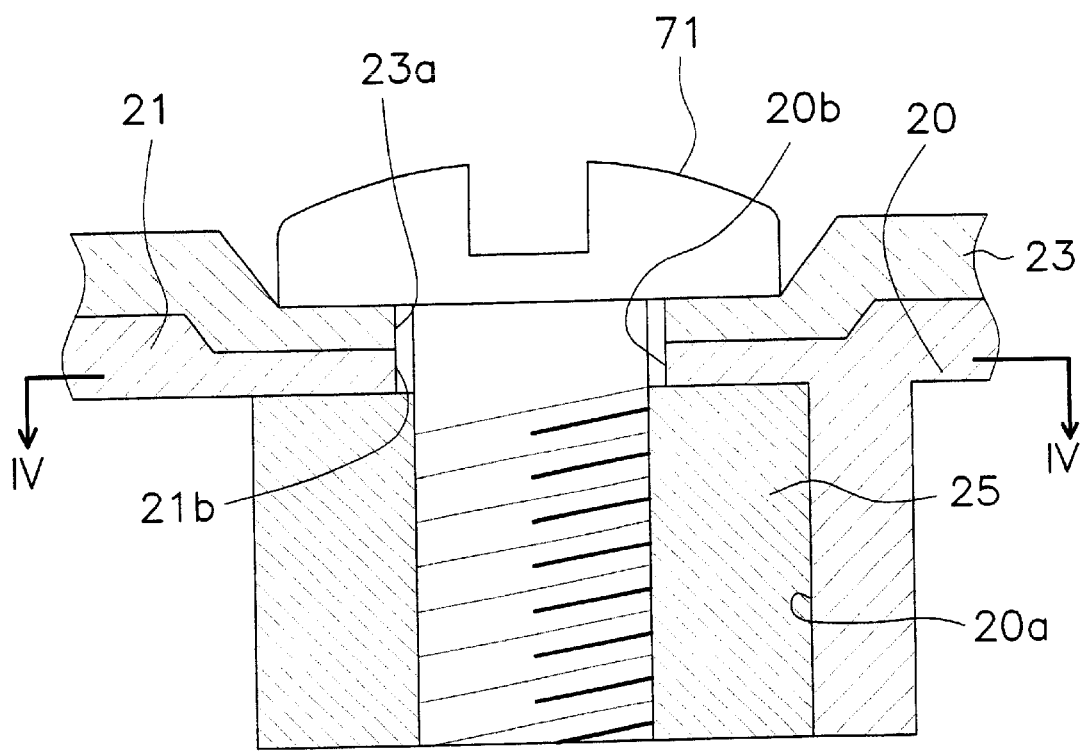
FIG. 3 is an enlarged cross-sectional view of a portion around the nut member, where the fastening structure in accordance with the first embodiment of the present invention is employed, viewed from the line III—III in FIG. 4.
Figure 4:
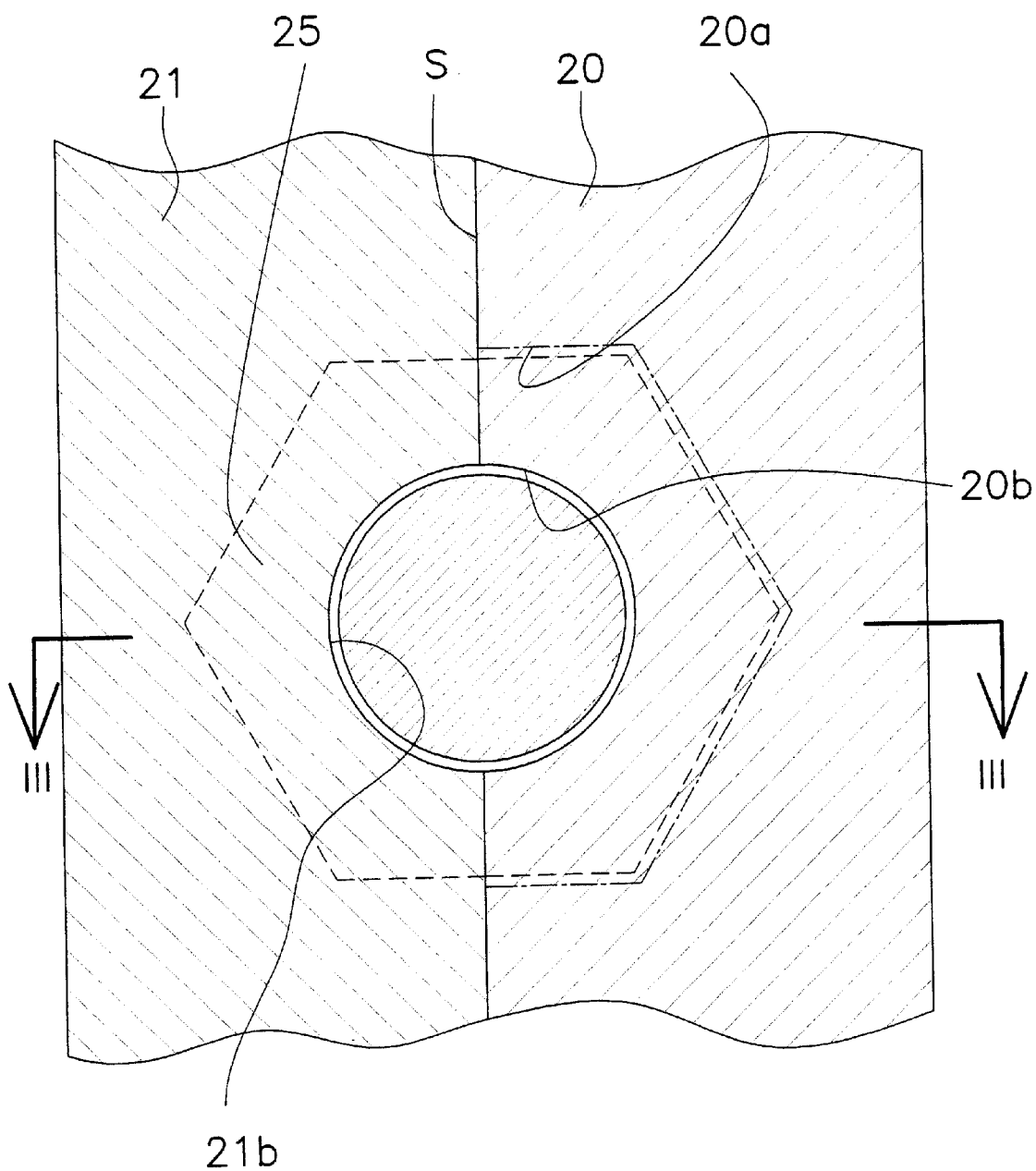
FIG. 4 is an enlarged cross-sectional view of the body member, the lid member, and the nut member, viewed from the line IV—IV in FIG. 3.

As shown in the enlarged views of FIGS. 3 and 4, a recessed portion 20a and a bore portion 20b are formed in the body member 20. The recessed portion 20a, into which the nut member 25 is non-rotatably attached, is formed in a contact surface S of the body member 20 (see FIG. 4), which contacts the lid member 21 (see FIGS. 1 and 4). The bore portion 20b, through which the screw member 71 is inserted, is connected to the recessed portion 20a. The surfaces that define the bore portion 20b and the recessed portion 20a open out toward the lid member 21. The body member 20 is formed by die-removal molding, and the recessed portion 20a and the bore portion 20b are simultaneously formed in one die-removal molding step.

A bore portion 21b is formed in the lid member 21. The bore portion 21b through which the screw member 71 is inserted, is formed in a contact surface S of the lid member 21, which contacts the body member 20. The surface that defines the bore portion 21b also opens out toward the bore portion 20b of the body member 20.

The cover member 23 has a screw hole 23a, to which the screw member 71 is coupled. The screw hole 23a is aligned with the bore portions 20b and 21b, such that the screw member 71 can be coupled to the bore portions 20b, 21b, and the screw hole 23a, and screwed into the nut member 25.

As shown in the enlarged views of FIGS. 3 and 4, the nut member 25 has the shape of hexagonal prism, the inner circumference of which is formed into a screw hole. The recessed portion 20a of the body member 20 is formed, in part, into the shape of hexagonal prism so that the nut member 25 can be non-rotatably engaged with the body member 20.

Here, the nut member 25 is attached to the body member 20 from the contact surface S side first, and the lid member 21 is attached to the body member 20 from the side. Then, the cover member 23 is attached from the rear of the body member 20 and the lid member 21, and these members are secured by screwing the screw member 71 into the nut member 25.

In a spinning reel thus configured, the recessed portion 20a into which the nut member 25 is non-rotatably attached, and the bore portion 20b into which the screw member 71 is inserted are formed in the body member 20. But here, since the recessed portion 20a and the bore portion 20b are formed such that surfaces defining the bore portion 20b and the recessed portion 20a open out, it is unnecessary to form screw holes in the body member 20 or the lid member 21 by post-processing. Therefore, the body member 20 and the lid member 21 can be fastened with a simple and inexpensive configuration.

Other Embodiments (a) In the foregoing embodiment, a reel unit of a spinning reel has been described to illustrate an example of the fastening structure of fishing equipment parts, but the invention is not limited to such application. The fastening structure of the present invention is applicable to other devices as well.

Figure 5:
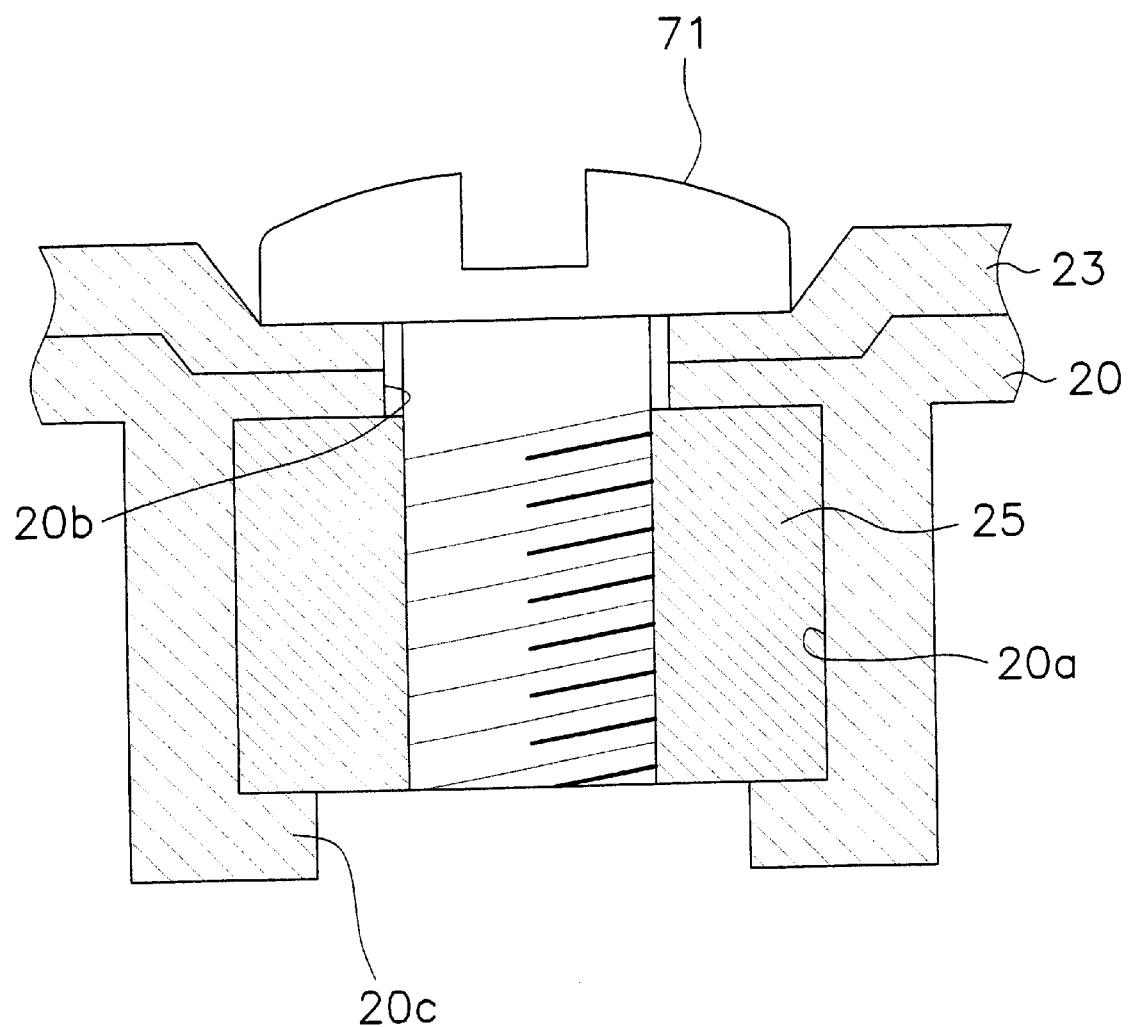
FIG. 5 is a view corresponding to FIG. 3, showing a fastening structure in accordance with another embodiment.

(b) As shown in FIG. 5, the body member 20 may have a protruding portion 20c contacting the nut member 25 and formed at an end of the recessed portion 20a. If this is the case, the nut member 25 can be attached so as to be sandwiched by the recessed portion 20a and the protruding portion 20c. Therefore, the movement of the nut member 25 in the axial direction can also be easily prevented.

Figure 6:
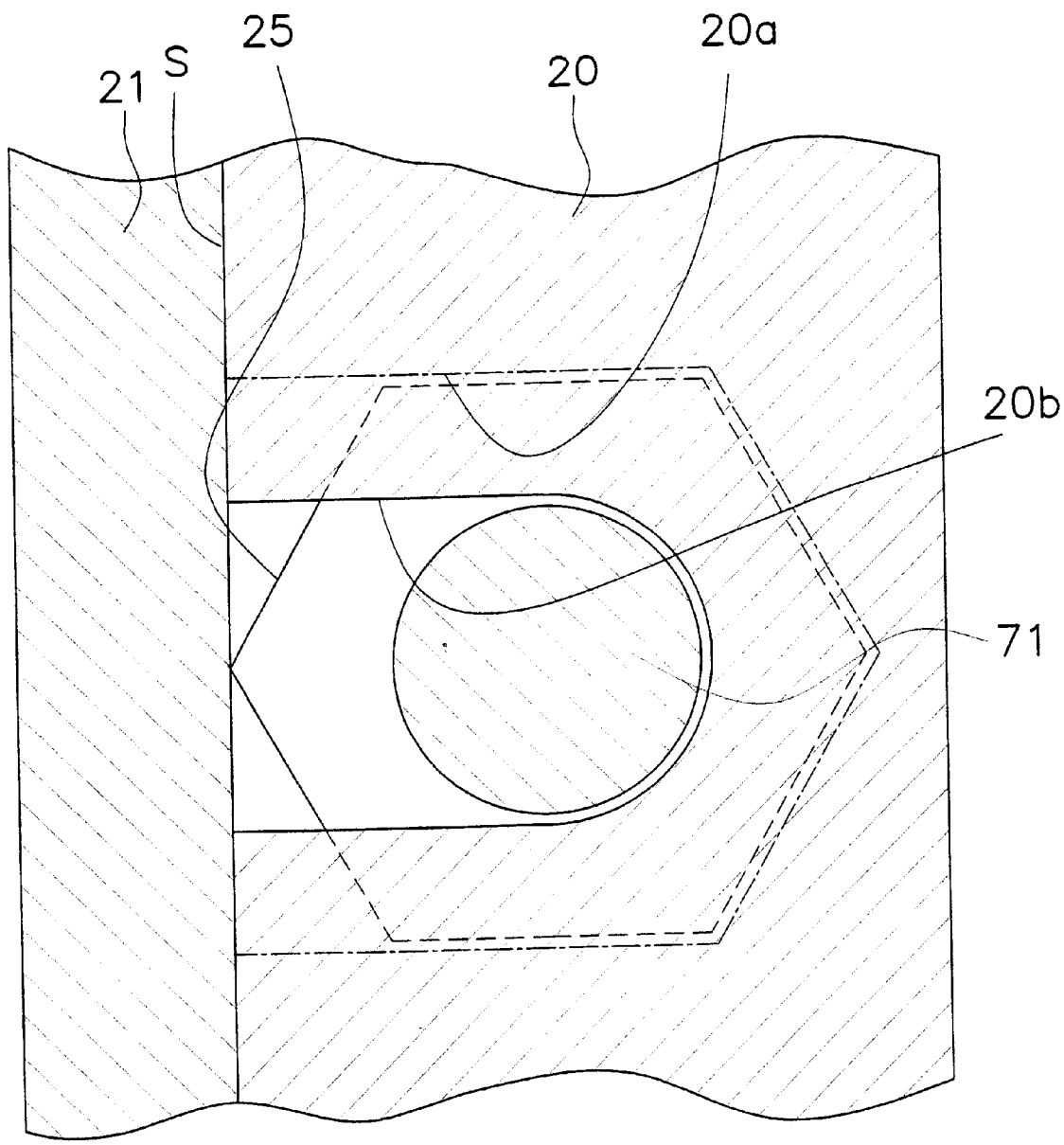
FIG. 6 is an enlarged cross-sectional view of the fastening structure in accordance with still another embodiment, corresponding to FIG. 4.

(c) In the foregoing embodiment, the bore portions 20b and 21b are provided in both the body member 20 and the lid member 21, while the recessed portion 20a is provided only in the body member 20. Alternatively, the recessed portion may be provided in both the body member 20 and the lid member 21, or only in the lid member 21. Also, the bore portion may be provided only in one of the body member 20 and the lid member 21. In that case, the bore portion can have a U-shape, instead of a semicircular shape, to accommodate the screw member. FIG. 6 shows a fastening structure in which the recessed portion 20a and the bore portion 20b are both provided only in the body member 20. As shown in FIG. 6, the bore portion 20b has a U-shape, instead of a semi-circular shape.

(d) In the foregoing embodiment, the body member 20 and the rod mounting leg 2b are formed in one piece, but it is also possible to form the lid member 21 in one piece with the rod mounting leg 2b.

Figure 7:
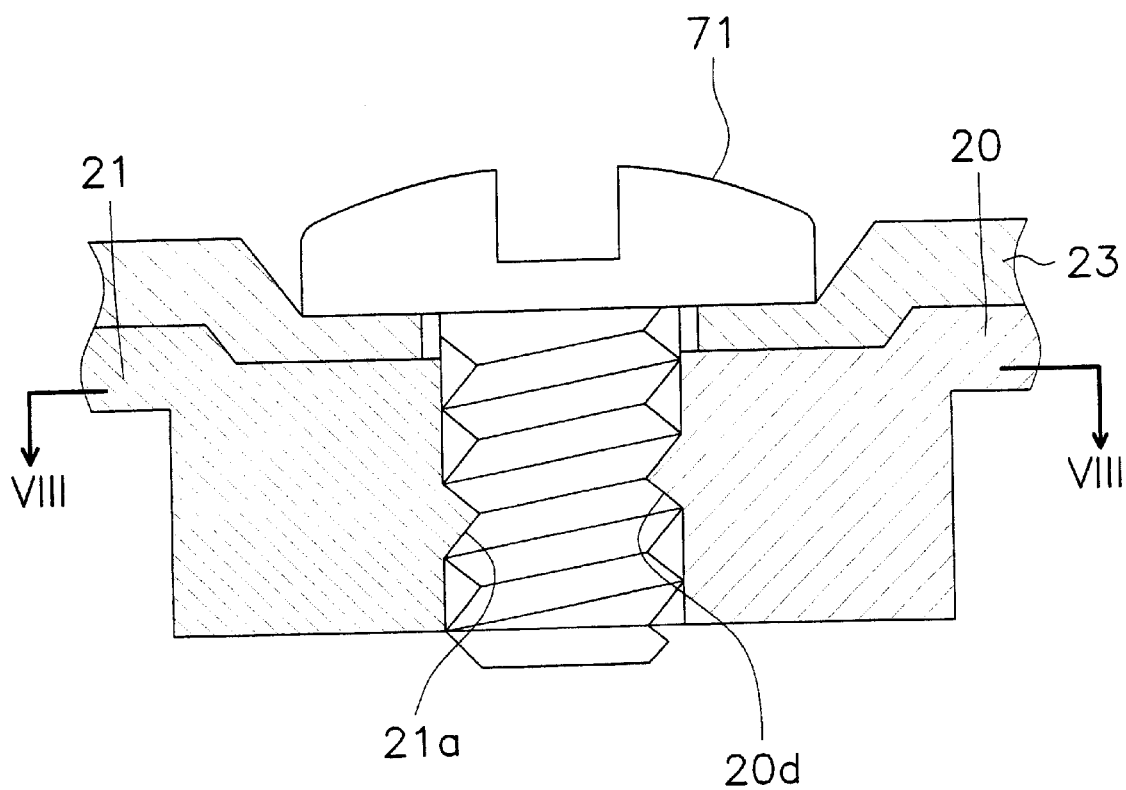
FIG. 7 is an enlarged cross-sectional view of a fastening structure in accordance with still another embodiment, showing a portion in the vicinity of female threaded portions.
Figure 8:
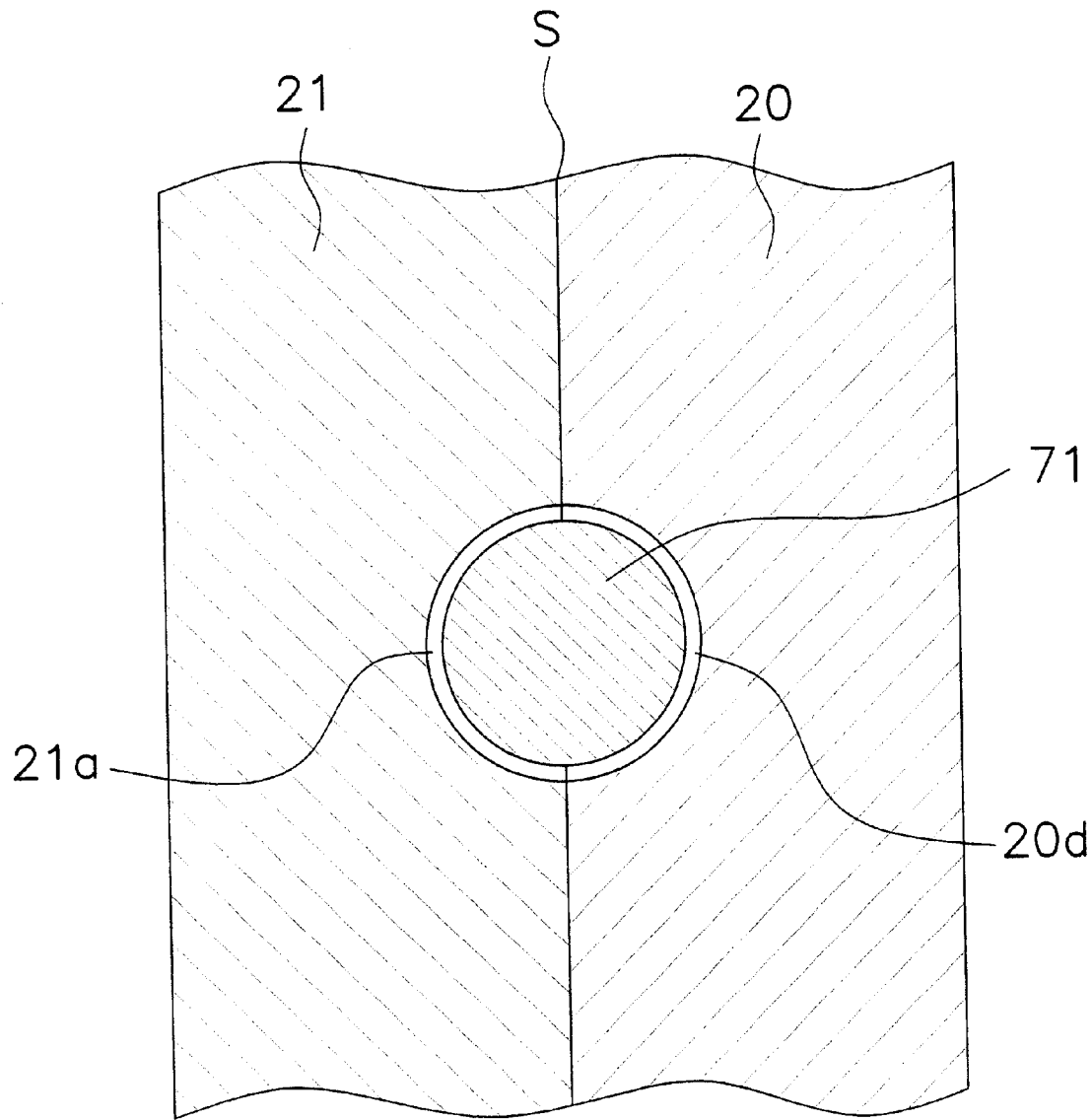
FIG. 8 is an enlarged cross-sectional view of the fastening structure in accordance with the embodiment shown in FIG. 7, showing a peripheral portion viewed from the line VIII—VIII in FIG. 7; and a fastening structure in accordance with still another embodiment.

(e) As shown in FIGS. 7 and 8, a first female threaded portion 20d and a second female threaded portion 21a may be respectively formed in the contact surface S of the body member 20 and the contact surface S of the lid member 21. In this case, when a cover member 23 is attached to the body member 20 and the lid member 21 and the body member 20 and the lid member 21 are joined together, these members are secured by screwing the screw member 71 into a single female thread that is formed by the first female threaded portion 20d and the second female threaded portion 21a.

(f) The first embodiment described above discloses a fastening structure having both the body member and the lid member. However, the fastening structure of the present invention can have only one of the body member and the lid member.

According to the present invention, fishing equipment parts can be fastened with a simple and inexpensive configuration. In the fastening structure of the present invention, a recessed portion to which a nut member is non-rotatably attached and a bore portion into which a screw member is inserted are formed in at least one of the first inner fishing equipment part and the outer fishing equipment part. Since the bore portion and the recessed portion are formed such that surfaces defining the bore portion and the recessed portion are open, the fishing equipment part with the bore portion and the recessed portion can be manufactured without having to perform a post-processing to create a screw hole.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-308503. The entire disclosure of Japanese Patent Application No. 2001-308503 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fastening structure for fishing equipment parts, comprising:
    a first inner fishing equipment part having a recessed portion and a bore portion, said recessed portion and said bore portion being formed such that surfaces defining said recessed portion and said bore portion open out and that said bore portion and said recessed portion are connected;
    an outer fishing equipment part having a screw hole;
    a nut member unrotatably coupled to said recessed portion of said first inner fishing equipment part; and
    a screw member coupled to said bore portion of said first inner fishing equipment part and said screw hole of said outer fishing equipment part to be screwed into said nut member.

2. The fastening structure for fishing equipment parts as set forth in claim 1, wherein
    said first inner fishing equipment part is formed by die-removal molding.

3. The fastening structure for fishing equipment parts as set forth in claim 1, wherein
    said nut member is coupled to said recessed portion so as to be immovable in an axial direction of said screw member.

4. The fastening structure for fishing equipment parts as set forth in claim 1, wherein
    said first inner fishing equipment part has a protruding portion with which said nut member is in contact.

5. The fastening structure for fishing equipment parts as set forth in claim 1, further comprising
    a second inner fishing equipment part disposed adjacent to said first inner fishing equipment, such that said surfaces defining said bore portion and said recessed portion open out toward said second inner fishing equipment.

6. The fastening structure for fishing equipment parts as set forth in claim 5, wherein
    said second inner fishing equipment part has a bore portion to which said screw member is coupled.

7. The fastening structure for fishing equipment parts as set forth in claim 6, wherein
    said bore portions of said first and second inner fishing equipment parts are threaded bores into which said screw member is screwed.

8. The fastening structure for fishing equipment parts as set forth in claim 6, wherein
    said bore portions of said first and second inner fishing equipment parts are both semi-circular in shape.

9. The fastening structure for fishing equipment parts as set forth in claim 5, wherein
    said second inner fishing equipment part has a recessed portion to which said nut member is coupled.

10. The fastening structure for fishing equipment parts as set forth in claim 5, wherein
    said first inner fishing equipment part is a body member of a reel body of a fishing reel,
    said second inner fishing equipment part is a lid member attached to said body member,
    and said outer fishing equipment part is a cover member fastened to said body member and said lid member.

11. A fishing reel, comprising:
    a reel unit rotatably supporting a handle, said reel unit including a reel body and a rod mounting leg extending from said reel body, said reel body having
        a body member having an opening,
        a lid member coupled to said body member to close said opening, at least one of said body member and said lid member having a recessed portion and a bore portion, said recessed portion and said bore portion being formed such that surfaces defining said recessed portion and said bore portion open out and that said bore portion and said recessed portion are connected, and
        a cover member attached to a rear of said body member and said lid member, said cover member having a screw hole,
        a nut member unrotatably coupled to said recessed portion, and
        a screw member coupled to said bore portion and said screw hole of said cover member to be screwed into said nut member;
    a rotor rotatably supported at a front of said reel unit; and
    a spool disposed at a front of said rotor so as to be movable back and forth.

12. The fishing reel as set forth in claim 11, wherein
    said one of said body member and lid member in which said recessed portion and said bore portion are formed is formed by die-removal molding.

13. The fishing reel as set forth in claim 11, wherein
    said nut member is coupled to said recessed portion so as to be immovable in an axial direction of said screw member.

14. The fishing reel as set forth in claim 11, wherein
    said one of said body member and lid member in which said recessed portion and said bore portion are formed has a protruding portion with which said nut member is in contact.

15. The fishing reel as set forth in claim 11, wherein
    said body member and said lid member are disposed adjacent to each other, such that said surfaces defining said bore portion and said recessed portion formed in said one of said body member and lid member open out toward the other of said body member and lid member.

16. The fastening structure for fishing equipment parts as set forth in claim 15, wherein
    the other of said body member and lid member has a bore portion to which said screw member is coupled.

17. The fishing reel as set forth in claim 16, wherein
    said bore portions of said body member and lid member are threaded bores into which said screw member is screwed.

18. The fastening structure for fishing equipment parts as set forth in claim 16, wherein
    said bore portions of said body member and lid member are both semi-circular in shape.

19. The fastening structure for fishing equipment parts as set forth in claim 15, wherein
    the other of said body member and lid member has a recessed portion to which said nut member is coupled.

20. The fastening structure for fishing equipment parts as set forth in claim 11, wherein
    said recessed portion and said bore portion are formed in said body member.

* * * * *